(12) United States Patent
Hedberg et al.

(10) Patent No.: US 11,627,520 B2
(45) Date of Patent: Apr. 11, 2023

(54) METHOD OF FACILITATING SELECTION OF NETWORK ACCESS FOR WIRELESS COMMUNICATION DEVICES

(71) Applicant: Telefonaktiebolaget LM Ericsson (publ), Stockholm (SE)

(72) Inventors: Tomas Hedberg, Nacka (SE); Jari Vikberg, Järna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/650,628

(22) PCT Filed: Oct. 13, 2017

(86) PCT No.: PCT/SE2017/051012
§ 371 (c)(1),
(2) Date: Mar. 25, 2020

(87) PCT Pub. No.: WO2019/074413
PCT Pub. Date: Apr. 18, 2019

(65) Prior Publication Data
US 2020/0236614 A1 Jul. 23, 2020

(51) Int. Cl.
*H04W 48/18* (2009.01)
*H04W 8/24* (2009.01)
(Continued)

(52) U.S. Cl.
CPC ............ *H04W 48/18* (2013.01); *H04W 8/24* (2013.01); *H04W 40/248* (2013.01); *H04W 64/003* (2013.01); *H04W 88/06* (2013.01)

(58) Field of Classification Search
CPC ....... H04W 48/18; H04W 8/24; H04W 88/06; H04W 40/248; H04W 64/003
See application file for complete search history.

(56) References Cited

U.S. PATENT DOCUMENTS

| 7,940,726 B2* | 5/2011 | Olsson ................. H04W 48/16 370/331 |
| 2010/0003980 A1 | 1/2010 | Rune et al. |

(Continued)

FOREIGN PATENT DOCUMENTS

| CN | 102281641 A | 12/2011 |
| CN | 102932933 A | 11/2012 |

(Continued)

OTHER PUBLICATIONS

Extended European Search Report issued for Application No./Patent No. 17928130.8-1212 / 3695651 PCT/SE2017051012—dated May 18, 2021.

(Continued)

*Primary Examiner* — Muthuswamy G Manoharan
(74) *Attorney, Agent, or Firm* — Baker Botts L.L.P.

(57) ABSTRACT

The invention relates to methods and devices for facilitating selection of network access for one or more wireless communication devices. A network connectivity selection node (106) establishes (S102) a connection with at least one reporting wireless communication device (101), receives (S103) information regarding topology of networks via which one or more modems (102-105) with which said at least one reporting wireless communication device is equipped is capable of performing access, as well as a current location of the at least one reporting wireless communication device, and stores (S104) the received network topology information and said location. Said node further establishes (S105) a connection with the one or more wireless communication devices for which selection of network is to be facilitated, determines (S106), from the network topology information, a recommendation on which network access the one or more wireless communication devices for which selection of network is to be facilitated should perform at said location, and transmits (S107), the (Continued)

recommendation to the one or more wireless communication devices for which selection of network is to be facilitated.

24 Claims, 3 Drawing Sheets

(51) Int. Cl.
*H04W 88/06* (2009.01)
*H04W 64/00* (2009.01)
*H04W 40/24* (2009.01)

(56) References Cited

U.S. PATENT DOCUMENTS

| | | |
|---|---|---|
| 2011/0029236 A1 | 2/2011 | Zhou |
| 2011/0116416 A1 | 5/2011 | Dobson et al. |
| 2012/0071165 A1 | 3/2012 | Pampu et al. |
| 2013/0143542 A1 | 6/2013 | Kovvali et al. |
| 2013/0150039 A1 | 6/2013 | Ramle et al. |
| 2013/0329639 A1* | 12/2013 | Wietfeldt .............. H04W 88/06 370/328 |
| 2014/0293982 A1 | 10/2014 | Gupta |
| 2018/0098276 A1* | 4/2018 | Livanos ................ H04W 4/025 |

FOREIGN PATENT DOCUMENTS

| | | | |
|---|---|---|---|
| CN | 102932933 A1 | 2/2013 | |
| CN | 103857011 A | 6/2014 | |
| CN | 104038983 A | 9/2014 | |
| CN | 104053215 A | 9/2014 | |
| CN | 104322086 A | 1/2015 | |
| CN | 104429128 A | 3/2015 | |
| CN | 105282195 A | 1/2016 | |
| EP | 2 169 975 A1 | 3/2010 | |
| EP | 2 919 529 A1 | 9/2015 | |
| FR | 2965688 A1 * | 4/2012 | ............ H04L 41/12 |
| GB | 2 422 515 A1 | 7/2006 | |
| GB | 2 491 869 A | 12/2012 | |

OTHER PUBLICATIONS

PCT International Search Report issued for International application No. PCT/SE2017/051012—dated Sep. 10, 2018.
PCT Written Opinion of the International Searching Authority for International application No. PCT/SE2017/051012—dated Sep. 10, 2018.
Chinese Office Action issued for Application No. 201780095735.9—dated Nov. 15, 2021.
Chinese Office Action issued for Chinese Patent Application No. 2017800957359 (English translation only)—dated Jan. 12, 2022.
Chinese Office Action issued for Application No. 201780095735.9—dated Jun. 14, 2022.

* cited by examiner

US 11,627,520 B2

METHOD OF FACILITATING SELECTION OF NETWORK ACCESS FOR WIRELESS COMMUNICATION DEVICES

PRIORITY

This nonprovisional application is a U.S. National Stage Filing under 35 U.S.C. § 371 of International Patent Application Serial No. PCT/SE2017/051012 filed Oct. 13, 2017 and entitled "METHOD OF FACILITATING SELECTION OF NETWORK ACCESS FOR WIRELESS COMMUNICATION DEVICES" which is hereby incorporated by reference in their entirety.

TECHNICAL FIELD

The invention relates to methods and devices for facilitating selection of network access for one or more wireless communication devices.

BACKGROUND

The current way of providing connectivity is tightly connected to the traditional way telecom operators have provided services, for instance telephony where users are local and operators act on a geographical limited area with competition among the local operators.

Each operator also has their own separate network with spectrum, radio, core and services with some exceptions where resources are shared to share cost.

There is an increasing interest in "global connectivity" solutions, i.e. solutions which are not restricted to specific national public land mobile networks (PLMNs) alone or national PLMNs in collaboration with selected international roaming partners. Shipping and freight industries, car manufacturers, emerging Internet of Things (IoT) applications, etc., desire one global communication solution. This solution may, depending on e.g. commercial agreements, use almost any PLMN. This solution should also change from one "active PLMN" to another, e.g. when the car travels across a national border.

In an example, a wireless communication device carried by a vehicle has multiple modems and SIMs/UICCs, used simultaneously for network access. As the vehicle, for instance a car or a boat, travels into an area within one and the same country, such as a rural area, where Operator A network performance or cost is inferior to that of Operator B, or e.g. where a particular frequency band of Operator B is superior in terms of Quality of Service (QoS) to any other frequency band of other operators in the area, it would be desirable to change the network access of at least one of the modems of the wireless communication device from Operator A to the particular frequency band of Operator B.

However, such flexibility is not provided in today's wireless communication systems.

SUMMARY

An object of the invention is to solve, or at least mitigate, this problem in the art and thus to provide an improved method of facilitating selection of network access for one or more wireless communication devices.

This object is attained in a first aspect of the invention, a method performed by a reporting wireless communication device is provided of facilitating selection of network access for one or more wireless communication devices. The method comprises acquiring information regarding topology of networks via which one or more modems with which the reporting wireless communication device is equipped is capable of performing access, as well as a current location of the reporting wireless communication device, establishing a connection with a network connectivity selection node being capable of determining which network access is available for the one or more wireless communication devices for which selection is to be facilitated, and reporting the acquired network topology information of each of said any modems, as well as said current location, to the network connectivity selection node, wherein the network connectivity selection node is capable of advising the wireless communication devices which network access to select when in the reported location based on the reported network topology information.

This object is attained in a second aspect of the invention, a reporting wireless communication device configured to facilitate selection of network access for one or more wireless communication devices is provided. The wireless communication device comprises a processing unit and a memory, which memory contains instructions executable by the processing unit, whereby the wireless communication device is operative to acquire information regarding topology of networks via which one or more modems with which the reporting wireless communication device is equipped is capable of performing access, as well as a current location of the reporting wireless communication device, establish a connection with a network connectivity selection node being capable of determining which network access is available for the one or more wireless communication devices for which selection is to be facilitated, and report the acquired network topology information of each of said any modems, as well as said current location, to the network connectivity selection node, wherein the network connectivity selection node is capable of advising the wireless communication devices which network access to select when in the reported location based on the reported network topology information.

This object is attained in a third aspect of the invention by a method performed by a network connectivity selection node of facilitating selection of network access for one or more wireless communication devices. The method comprises establishing a connection with at least one reporting wireless communication device, receiving information regarding topology of networks via which one or more modems with which said at least one reporting wireless communication device is equipped is capable of performing access, as well as a current location of the at least one reporting wireless communication device, and storing the received network topology information and said location. The method further comprises establishing a connection with the one or more wireless communication devices for which selection of network is to be facilitated, determining, from the network topology information, a recommendation on which network access the one or more wireless communication devices for which selection of network is to be facilitated should perform at said location, and transmitting, the recommendation to the one or more wireless communication devices for which selection of network is to be facilitated.

This object is attained in a fourth aspect of the invention by a network connectivity selection node configured to facilitate selection of network access for one or more wireless communication devices. The network connectivity selection node comprises a processing unit and a memory, which memory contains instructions executable by said processing unit, whereby the network connectivity selection node is operative to establish a connection with at least one reporting wireless communication device, receive information regarding topology of networks via which one or more modems with which said at least one reporting wireless communication device is equipped is capable of performing access, as well as a current location of the at least one reporting wireless communication device, and store the received network topology information and said location. The network connectivity selection node is further operative to establish a connection with the one or more wireless communication devices for which selection of network is to be facilitated, determine, from the network topology information, a recommendation on which network access the one or more wireless communication devices for which selection of network is to be facilitated should perform at said location, and transmit, the recommendation to the one or more wireless communication devices for which selection of network is to be facilitated.

This object is attained in a fifth aspect of the invention by a method performed by a wireless communication device of performing network access to one or more communication networks. The method comprises receiving, from a network connectivity selection node being capable of determining which network access is available for said wireless communication device, a recommendation on which network access to perform in a particular location, the recommendation having been created by the network connectivity selection node based on earlier network topology information of at least one reporting wireless communication device in said particular location.

This object is attained in a sixth aspect of the invention by a wireless communication device configured to perform network access to one or more communication networks. The wireless communication device comprises a processing unit and a memory, which memory contains instructions executable by said processing unit, whereby the wireless communication device is operative to receive, from a network connectivity selection node being capable of determining which network access is available for said wireless communication device, a recommendation on which network access to perform in a particular location, the recommendation having been created by the network connectivity selection node based on earlier network topology information of at least one reporting wireless communication device in said particular location.

Advantageously, network access inflexibility problems in the art can be overcome as proposed by an embodiment.

A first, reporting wireless communication device (WCD) reports information regarding topology of networks via which any WCD modem is capable of performing network access, as well as a current location of the first WCD, to a network device referred to as a network connectivity selection (NCS) node.

The network topology information would typically include information such as which frequency bands, Radio Access Technologies (RATs), operators, etc. are available to one or more of the modems at the current location of the first WCD, possibly even at which QoS and at which cost. Now, the first WCD may report the network topology information along with its current location to the NCS node at any time, and is thus not necessarily triggered to perform the reporting, even though it is envisaged that the NCS node explicitly may request the first WCD to perform the reporting or for instance that the WCD is in a particular location where the reporting would be desired such as at a national border or when the WCD is in a particular location for which the NCS node does not have any network topology information, or that the network topology information is available but was collected a long time ago and there is a need to update the available network topology information.

The NCS node logic is implemented as a network function residing "on top" of different access networks via which the WCD may perform network access and can determine which one of the modems should be used for connecting the first WCD to an appropriate communication network, or even to a plurality of the networks.

The NCS node thus holds or has access to global network topology information at various locations, as reported by the first WCD—and in practice hundreds or even thousands of other reporting WCDs—for instance by accessing a local or remote database where all the reported data of the reporting WCDs is accommodated. The NCS node is typically connected to a packet data network such as the Internet. Further, it may be envisaged that the NCS node collects network topology data from network topology database(s) holding network topology information of more static nature.

Advantageously, by collecting network topology information at various locations from a great number of reporting WCDs, in this particular embodiment exemplified by first WCD, the NCS node may provide a recommendation to an individual WCD, such as second WCD residing at or heading to the same (or similar) location as the reporting WCD, which network access is most suitable, based on some appropriate criterion, such as "best possible QoS", "lowest possible cost", "packet data transfer with an upper limit as regards latency", etc. As is understood, any appropriate criterion could be applied depending on what a user of a WCD desires.

In an embodiment it is envisaged that the first, reporting WCD is the WCD for which network access selection is to be facilitated, wherein the first WCD receives, in reply to the reporting, a recommendation on which network access to perform at the reported location from the NCS node, which recommendation the first WCD may chose or not chose to follow.

In a further embodiment, the first, reporting WCD receives a trigger for acquiring the information regarding topology of networks via which one or more modems with which the reporting wireless communication device is equipped is capable of performing access, as well as a current location of the reporting wireless communication device, for instance from the NCS node.

In embodiments, the network topology information is acquired from broadcasted or unicasted network topology information.

In a seventh aspect of the invention, a computer program is provided comprising computer-executable instructions for causing a wireless communication device to perform steps recited in the method of the first aspect when the computer-executable instructions are executed on a processing unit included in the wireless communication device.

In an eighth aspect of the invention, a computer program product is provided comprising a computer readable medium, the computer readable medium having the computer program of the seventh aspect embodied thereon.

In a ninth aspect of the invention, a computer program is provided comprising computer-executable instructions for causing a network connectivity selection node to perform steps of the method of the third aspect when the computer-executable instructions are executed on a processing unit included in the Session Management Function.

In a tenth aspect of the invention, a computer program product is provided comprising a computer readable medium, the computer readable medium having the computer program of the ninth aspect embodied thereon.

In a eleventh aspect of the invention, a computer program is provided comprising computer-executable instructions for causing a wireless communication device to perform steps recited in the method of the fifth aspect when the computer-executable instructions are executed on a processing unit included in the wireless communication device.

In a twelfth aspect of the invention, a computer program product is provided comprising a computer readable medium, the computer readable medium having the computer program of the eleventh aspect embodied thereon.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In for instance freight applications, a vehicle such as a boat or a car may carry one or more wireless communication devices being equipped with multiple modems and SIMs, used simultaneously for different types of network accesses (e.g. 2G, 3G, 4G, 5G, WiFi, etc.), as well as for the same type of network access. As the vehicle crosses country borders, implying that a different operator must be used for connectivity, or travels within one and the same country into areas where Operator A network performance or cost is inferior to that of Operator B, there may be a need to change the network access of at least one of the modems of the wireless communication device from Operator A to Operator B, or to change Radio Access Technology (RAT) such as from a 4G to a 3G network access.

The evaluation of "better performance" is a joint optimization of Operator A and Operator B characteristics such as RATs, frequency bands, supported network features and capabilities, Quality of Service (QoS), etc.

Figure 1:
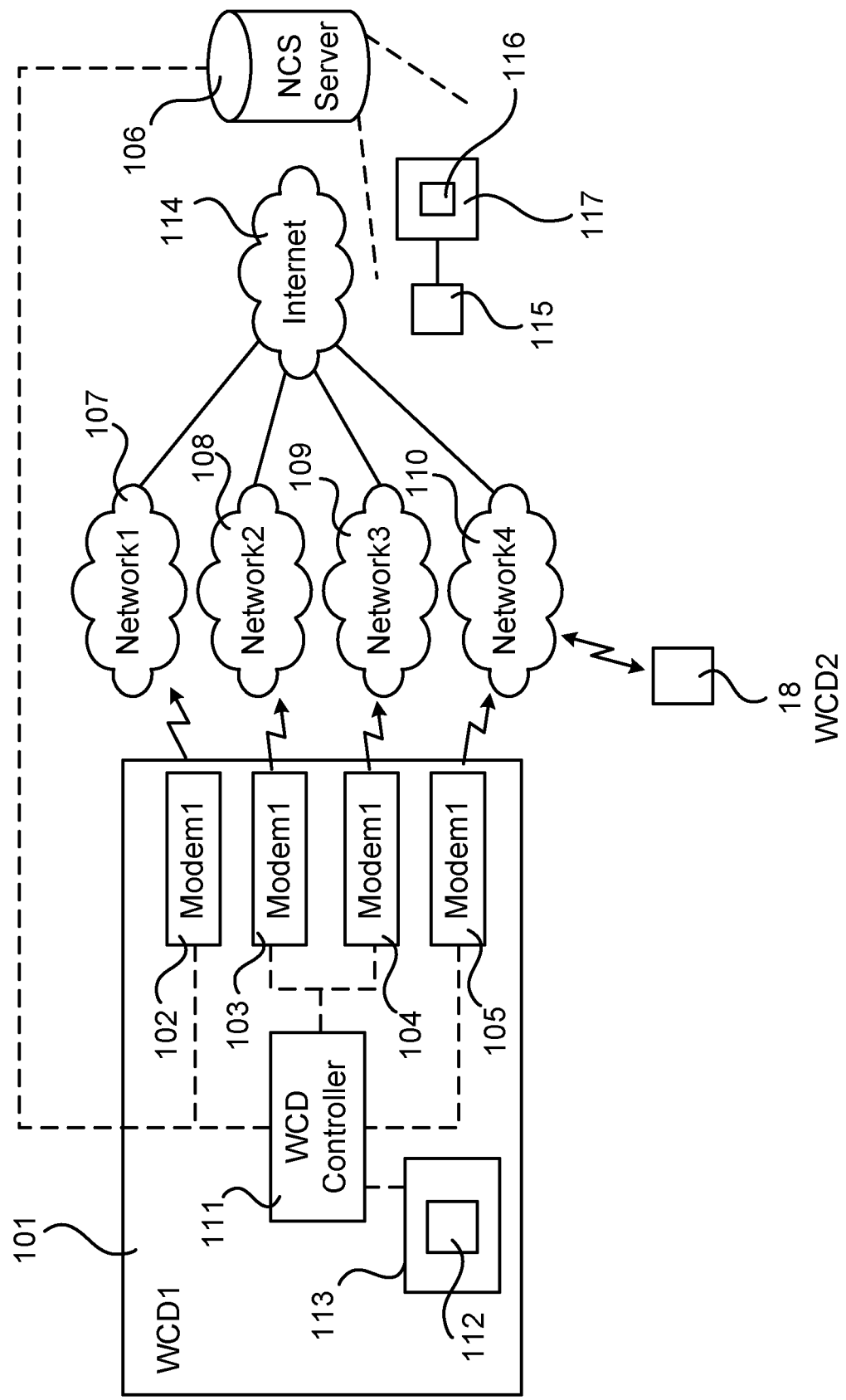
FIG. 1 illustrates a wireless communication device and a network connectivity selection server according to embodiments.

A wireless communication device in an embodiment illustrated with reference to FIG. 1 facilitates solving the previously mentioned prior art problems as regards network access inflexibility in that a first wireless communication device (WCD) 101 advantageously reports information regarding topology of networks via which any modems 102-105 with which the first, reporting WCD 101 is equipped is capable of performing access, i.e. listening to broadcasted information or to dedicated unicasted information, as well as a current location of the first WCD 101, to a network device referred to as a network connectivity selection (NCS) node 106, in this particular example illustrated in the form of a server.

In this particular example, the first WCD 101 comprises four modems 102-105, but the first WCD 101 could be embodied in the form of a device such as a smart phone or a tablet comprising a single modem.

The network topology information would typically include information such as which frequency bands, RATs, operators, etc. are available to one or more of the modems 102-105 at the current location of the first WCD 101, possibly even at which QoS and at which cost. Now, the first WCD 101 may report the network topology information along with its current location to the NCS server 106 at any time, and is thus not necessarily triggered to perform the reporting, even though it is envisaged that the NCS server 106 explicitly may request the first WCD 101 to perform the reporting or for instance that the WCD 101 is in a particular location where the reporting would be desired such as at a national border or when the WCD 101 is in a particular location for which the NCS server 106 does not have any network topology information, or that the network topology information is available but was collected a long time ago and there is a need to update the available network topology information.

The NCS server logic is implemented as a network function residing "on top" of the different access networks 107, 108, 109, 110 and can determine which one of the modems 102-105 should be used for connecting the first WCD 101 to an appropriate communication network 107-110, or even to a plurality of the networks; the first WCD 101 may for instance be connected via third modem 104 to third network 109 by means of WiFi, while also being connected to fourth network 110 via a fourth modem 105 by means of 4G). Each modem 106-109 is capable of connecting the first WCD 101 to one or more of the communication networks 107-110.

It may further be that two or more of the modems support the same RAT, but where a respective one of the modems are used for connecting to different access networks. For instance, first modem 102 and second modem 103 may both be capable of 3G communication, but the first modem 102 will be used for 3G communication with Operator A via first network 107 while the second modem 103 will be used for 3G communication with Operator B via second network 108.

The NCS server 106 thus holds or has access to global network topology information at various locations, as reported by the first WCD 101—and in practice hundreds or even thousands of other reporting WCDs—for instance by accessing a local or remote database where all the reported data of the reporting WCDs is accommodated. The NCS server 106 is typically connected to a packet data network such as the Internet 114. Further, it may be envisaged that the NCS server 106 collects network topology data from network topology database(s) holding network topology information of more static nature.

Advantageously, by collecting network topology information at various locations from a great number of reporting WCDs, in this particular embodiment exemplified by first WCD 101, the NCS 106 may provide a recommendation to an individual WCD, such as second WCD 118 residing at or heading to the same (or similar) location as the reporting WCD 101, which network access is most suitable, based on some appropriate criterion, such as "best possible QoS", "lowest possible cost", "packet data transfer with an upper limit as regards latency", etc. As is understood, any appropriate criterion could be applied depending on what a user of a WCD desires.

As is understood, the steps of the method performed by the first WCD 101 of enabling access to a plurality of communication networks according to embodiments are in practice performed by a WCD controller 111, i.e. a processing unit embodied in the form of one or more microprocessors arranged to execute a computer program 112 downloaded to a suitable storage volatile medium 113 associated with the microprocessor, such as a Random Access Memory (RAM), or a non-volatile storage medium such as a Flash memory or a hard disk drive. The processing unit 111 is arranged to cause the first WCD 101 to carry out the method according to embodiments when the appropriate computer program 112 comprising computer-executable instructions is downloaded to the storage medium 113 and executed by the processing unit 111. The storage medium 113 may also be a computer program product comprising the computer program 112.

Alternatively, the computer program 112 may be transferred to the storage medium 113 by means of a suitable computer program product, such as a Digital Versatile Disc (DVD) or a memory stick. As a further alternative, the computer program 112 may be downloaded to the storage medium 113 over a network. The processing unit 111 may alternatively be embodied in the form of a digital signal processor (DSP), an application specific integrated circuit (ASIC), a field-programmable gate array (FPGA), a complex programmable logic device (CPLD), etc. Typically, the second WCD 118 has the same configuration as that just described for the first WCD 101.

Correspondingly, the NCS server 106 comprises a processing unit 115 embodied in the form of one or more microprocessors arranged to execute a computer program 116 downloaded to a suitable storage volatile medium 117 associated with the microprocessor for performing a method of facilitating, for a wireless communication device, access to a plurality of communication networks.

Figure 2:
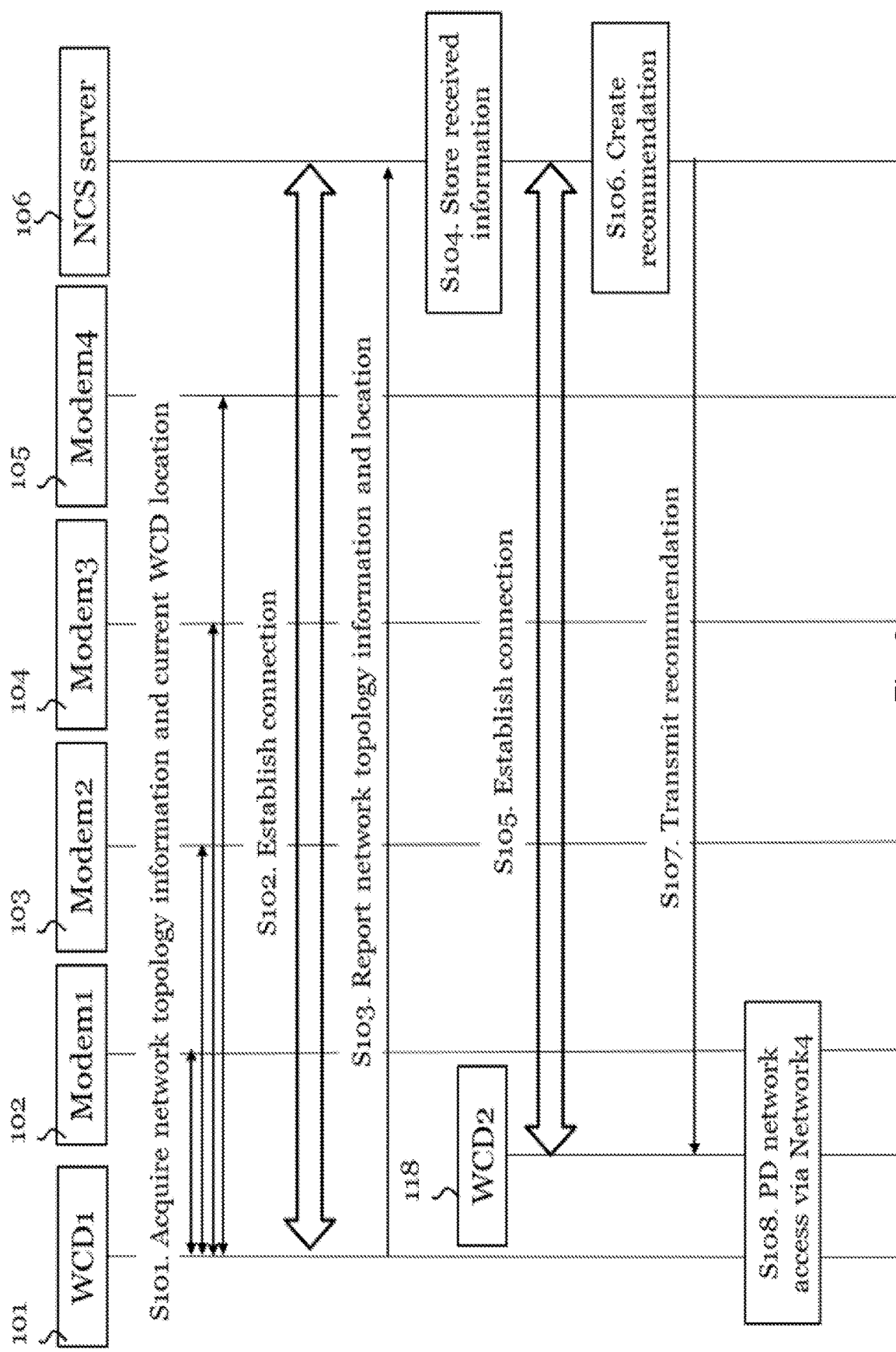
FIG. 2 shows a signalling diagram illustrating a method of enabling access to a plurality of communication networks for a wireless communication device according to an embodiment.

FIG. 2 shows a signalling diagram illustrating an exemplifying embodiment of facilitating selection of network access for one or more wireless communication devices, where the first WCD 101 will report network topology information for a particular WCD location to the NCS server 106, which in its turn will advise—based on the reported network topology information—the second WCD 118 on which network access to perform when in the location reported by the first WCD 101.

For instance, the first WCD 101 may reside in a car travelling through a rural area of a country where it may be important to select a best-performance access in order to set up communication with an operator at all, since not all operators tend to offer coverage in such areas. When the second WCD 118 arrives at this rural area, it can take advantage of the network topology information previously reported by the first WCD 101.

In step S101 the first WCD 101 acquires, via the WCD controller 111, information regarding topology of networks 107-110 via which the modems 102-105 of the first, reporting WCD 101 are capable of performing access, as well as a current location of the first WCD 101, typically by a GPS readout.

After (or even before) having acquired the network topology information and current WCD location, the first WCD 101 establishes a connection to the NCS server 106. In this particular example, the connection is established in step S102 after the acquiring of the network topology information and the current WCD location has been performed. The connection could for instance be a direct connection established between the first WCD 101 and the NCS server 106, or based on a Packet Data Network (PDN) connection, a Packet Data Protocol (PDP) context or a Packet Data Unit (PDU) session in the different access networks 107-110 providing connectivity to the Internet 114 and further to the NCS server 106.

It is noted that in this particular exemplifying embodiment, the first WCD 101 is not subjected to any trigger for acquiring the information, but may in fact perform this action occasionally in order to continuously provide the NCS server 106 with useful network topology information associated with a particular location.

In step S103, the first WCD 101 reports the acquired network topology information collected by the modems 102-105, as well as the current WCD location, to the NCS server 106 over the established connection.

Upon receiving the information, the NCS server 106 adds it in step S104 to a database accommodating a great number of sets of network topology information each associated to a particular location, which information sets in a similar manner has been reported by other WCDs to the NCS server 106.

As a result, the NCS server 106 advantageously has access to a great amount of network topology information at different locations, possibly even on a global basis. However, it may also be the case that the NCS server 106 holds a great amount of network topology information for a limited area, such as a well-populated square or block in a metropolis.

Now, the NCS server 106 uses this database of network topology information to advise WCDs (not necessarily the currently reporting WCD 101, even if that could be the case as will be discussed later) on which network access is best suited for the advised WCD(s).

In this particular exemplifying embodiment, the NCS server 106 will use the network topology information reported by the first WCD 101 to advise the second WCD 118 on which network access to perform when being in the location reported by the first WCD 101. It should be noted that a great number of WCDs may have reported their network topology information from the same (or at least similar) location as that of the first WCD 101.

Now, when the second WCD 118 is in, or approaches, the same or at least similar location close or adjacent to said same location as that reported by the first WCD 101, the second WCD 118 or the NCS server 106 initiate establishing of a connection between the second WCD 118 and the NCS server 106 in step S105. It should be noted that the reporting of the network topology information of the first WCD 101 may occur long before the recommendation is sent to the second WCD 118.

It should be noted that the second WCD 118 at any time may request a recommendation from the NCS server 106 on which network access to select; the request is not necessarily triggered by an event such as the approaching of a particular geographical area.

The NCS server 106 builds a policy/recommendation regarding which network access the second WCD 119 should perform based at least on the data reported by the first WCD 101 (but possibly on a greater amount of network topology information reported by many WCDs for this particular location) in step S106, knowing the topology in the network and which possible networks to establish connections with and therefore being capable of taking an informed decision as regards the recommendation on which network access the WCD to be advised should select.

Thereafter, in step S107, the NCS server 106 transmits the recommendation to the second WCD 118 on which network access to perform at this particular location.

Now, upon receiving the recommendation, the second WCD 118 may or may not choose to follow the recommendation. However, in this particular example, the second WCD 118 follows the recommendation in step S108.

In this example, the recommendation to the second WCD 118 is to connect to the fourth network 110 for performing a packet-data (PD) type transfer (being e.g. a 4G network). In another example, the recommendation could have been to perform a circuit-switched telephone call via the second network 108 (being e.g. a 3G network) using a particularly favourable frequency band in terms of speech quality.

In an alternative example, the second WCD 118 is recommended to connect to a packet-switched domain via two different networks, for instance via the second network 108 and the third network 109. The two packet-data connections can then be used in different ways; in a first scenario one network is actively used while the other is standby (for the case that the first network performance changes). In a second scenario, both networks are used simultaneously for so called traffic aggregation.

Advantageously, the NCS server 106 with its network topology knowledge provides a recommendation pertaining to the network access to be selected by the second WCD 118 by taking into account reported network topology information for the particular location of the second WCD 118, in order to provide a recommendation best suited for the second WCD 101 at the given location.

As previously has been mentioned, it may be envisaged that the first, reporting WCD 101 also is the WCD being advised by the NCS server 106 on how to perform network access after first having performed the reporting of network topology information at a particular location to the NCS server 106. In such embodiment, steps S104, S106, S107 and S108 are undertaken, but generally not step S105 of establishing a connection, since the connection established in step S102 typically still is set up between the first WCD 101 and the NCS server 106.

In an embodiment, the first, reporting WCD 101 acquires the network topology information from its modems 102-105 via broadcasted information being sent across the networks 107-110. For instance, the broadcasted information may trigger the first, reporting WCD 101 to scan a plurality of frequency bands for determining characteristics of the frequency bands.

In another embodiment, the modems 102-105 are controlled by the WCD controller 111 to actively connect to the networks 107-110 for acquiring network topology information.

Hence, again with reference to step S101 of FIG. 2, the acquiring of network topology information from the modems 102-105 by having the modems scan information sent (either broadcasted or unicasted) over the different access networks 107-110 and to report these to the NCS server 106. An example of such information is system information broadcasted in 3GPP RATs providing information about current and neighbouring cells, beams, RATs and frequencies in both active and idle modes. Another example is beacon signals transmitted by WiFi Access Points (APs). This information is used for building of network topology information for global connectivity solutions. Further, system information may also be provided using a concept known as "system information on demand" currently being discussed for 5G New Radio (NR) radio access. In this case, the system information may be specifically requested from the network by the modem and the system information may be provided to the either using broadcast or unicast transmission.

Another example of network topology information being acquired by the modems 102-105 is information being carried by WiFi APs broadcast beacon signals revealing information about the current coverage area. The WiFi broadcast beacon signals Hot spot 2.0 Access Network Query Protocol (ANQP) is an example carrying "on demand" information, which includes e.g. supported service providers.

Figure 3:
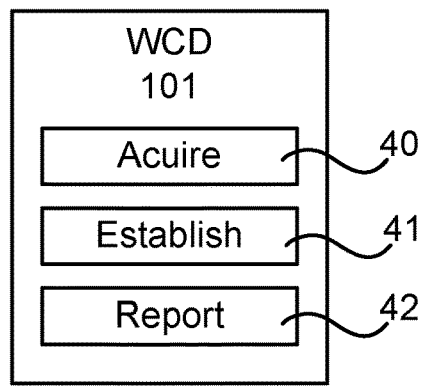
FIG. 3 illustrates a wireless communication device according to an embodiment.

FIG. 3 illustrates a WCD 101 configured to access one or more communication networks. The WCD 101 comprises acquiring means 40 adapted to acquire information regarding topology of networks via which one or more modems with which the reporting wireless communication device is equipped is capable of performing access, as well as a current location of the reporting wireless communication device, establishing means 41 adapted to establish a connection with a network connectivity selection node being capable of determining which network access is available for the one or more wireless communication devices for which selection is to be facilitated, and reporting means 42 adapted to report the acquired network topology information of each of the modems, as well as the current location, to the network connectivity selection node, wherein the network connectivity selection node is capable of advising the wireless communication devices which network access to select when in the reported location based on the reported network topology information.

The means 40-42 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 4:
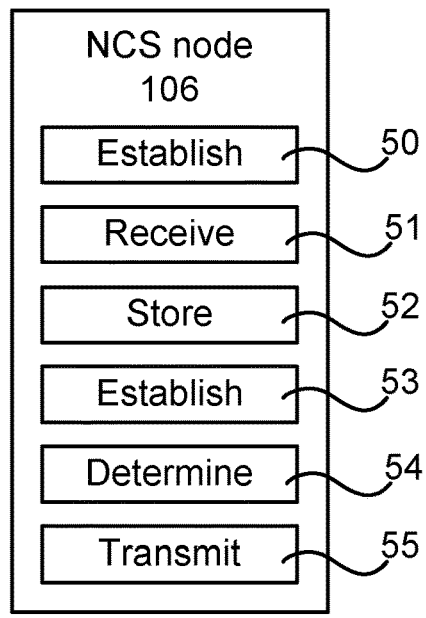
FIG. 4 illustrates a network connectivity selection node according to an embodiment.

FIG. 4 illustrates an NCS node 106 configured to facilitate, for a wireless communication device, access to a plurality of communication networks. The NCS node 106 comprises establishing means 50 adapted to establish a connection with at least one reporting wireless communication device, receiving means 51 adapted to receive information topology of networks via which one or more modems with which said at least one reporting wireless communication device is equipped is capable of performing access, as well as a current location of the at least one reporting wireless communication device, storing means 52 adapted to store the received network topology information and said location, establishing means 53 adapted to establish a connection with the one or more wireless communication devices for which selection of network is to be facilitated, determining means 54 adapted to determine, from the network topology information, a recommendation on which network access the one or more wireless communication devices for which selection of network is to be facilitated should perform at said location, and transmitting means 55 adapted to transmit the recommendation to the one or more wireless communication devices for which selection of network is to be facilitated.

The means 50-55 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 5:
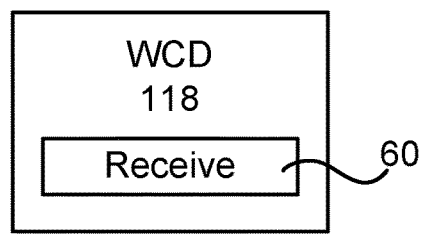
FIG. 5 illustrates a wireless communication device according to another embodiment.

FIG. 5 illustrates a WCD 118 configured to access one or more communication networks. The WCD 118 comprises receiving means 60 adapted to receive, from a network connectivity selection node being capable of determining which network access is available for said wireless communication device, a recommendation on which network access to perform in a particular location, the recommendation having been created by the network connectivity selection node based on earlier network topology information of at least one reporting wireless communication device in said particular location.

The means 60 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a reporting wireless communication device of facilitating selection of network access for one or more wireless communication devices, comprising:
   acquiring information regarding topology of networks via which one or more modems with which the reporting wireless communication device is equipped is capable of performing access, as well as a current location of the reporting wireless communication device, wherein the network topology information comprises information about one or more neighbouring cells with respect to where the reporting wireless communication device is located and one or more supported Radio Access Technologies, RATs, at the current location of the reporting wireless communication device;
   establishing a connection with a network connectivity selection node being capable of determining which network access is available for the one or more wireless communication devices for which selection is to be facilitated; and
   reporting the acquired network topology information of each of said any modems, as well as said current location, to the network connectivity selection node, wherein the network connectivity selection node is capable of advising the one or more wireless communication devices which network access to select when in the reported location based on the reported network topology information, such that a recommendation about which network access to use to perform at the reported location is determined based at least on the network topology information, and the recommendation is transmitted to at least the one or more wireless communication devices other than the reporting wireless communication device when the one or more wireless communication devices is approaching the current location of the reporting wireless communication device,
   wherein the selected network access is determined such that using the selected network access at the current location of the reporting wireless communication device leads to a packet data transfer with best possible Quality of Service, QoS, lowest possible cost, the packet data transfer with an upper limit as regards latency, or other appropriate criterion compared to other network accesses supported by the one or more supported RATs that are available at the current location of the reporting wireless communication device.

2. The method of claim 1, wherein the reporting wireless communication device is the wireless communication device for which network access selection is to be facilitated, further comprising:
   receiving, in reply to the reporting, the recommendation on which network access to perform at the reported location.

3. The method of claim 2, further comprising:
   performing the network access in accordance with the received recommendation.

4. The method of claim 1, further comprising:
   receiving a trigger for acquiring the information regarding topology of networks via which one or more modems with which the reporting wireless communication device is equipped is capable of performing access, as well as a current location of the reporting wireless communication device.

5. The method of claim 1, the acquiring of network topology information comprising:
   acquiring broadcasted network topology information.

6. The method of claim 1, the acquiring of network topology information comprising:
   acquiring unicasted network topology information.

7. The method according to claim 1, the network topology information further comprising one or more of supported Radio Access Technologies, RATs, frequency bands, available network features, Quality of Service, QoS, bandwidth capacity, and signal quality.

8. A computer program comprising computer-executable instructions for causing a wireless communication device to perform steps recited in claim 1 when the computer-executable instructions are executed on a processing unit included in the wireless communication device.

9. A method performed by a network connectivity selection node of facilitating selection of network access for one or more wireless communication devices, the method comprising:
   establishing a connection with at least one reporting wireless communication device;
   receiving information regarding topology of networks via which one or more modems with which said at least one reporting wireless communication device is equipped is capable of performing access, as well as a current location of the at least one reporting wireless communication device, wherein the network topology information comprises information about one or more neighbouring cells with respect to where the reporting wireless communication device is located and one or more supported Radio Access Technologies, RATs, at the current location of the reporting wireless communication device;

storing the received network topology information and said location;

establishing a connection with the one or more wireless communication devices for which selection of network is to be facilitated;

determining, from the network topology information, a recommendation on which network access the one or more wireless communication devices for which selection of network is to be facilitated should perform at said location; and transmitting, the recommendation to the one or more wireless communication devices for which selection of network is to be facilitated when the one or more wireless communication devices is approaching the current location of the reporting wireless communication device, wherein the one or more wireless communication devices are separate from the at least one reporting wireless communication device, wherein the selected network access is determined such that using the selected network access at the current location of the reporting wireless communication device leads to a packet data transfer with best possible Quality of Service, QoS, lowest possible cost, the packet data transfer with an upper limit as regards latency, or other appropriate criterion compared to other network accesses supported by the one or more supported RATs that are available at the current location of the reporting wireless communication device.

10. The method of claim 9, wherein the reporting wireless communication device is the wireless communication device for which network access selection is to be facilitated.

11. The method of claim 9, further comprising:

transmitting a trigger to the reporting wireless communication device for acquiring the information regarding topology of networks via which one or more modems with which the reporting wireless communication device is equipped is capable of performing access, as well as a current location of the reporting wireless communication device.

12. A computer program comprising computer-executable instructions for causing a network connectivity selection node to perform steps recited in claim 9 when the computer-executable instructions are executed on a processing unit included in the network connectivity selection node.

13. A method performed by a wireless communication device of performing network access to one or more communication networks, comprising:

receiving, from a network connectivity selection node being capable of determining which network access is available for said wireless communication device, a recommendation on which network access to perform in a particular location, the recommendation having been created by the network connectivity selection node based on earlier network topology information of at least one reporting wireless communication device in said particular location, wherein the recommendation is transmitted to at least one or more wireless communication devices other than the reporting wireless communication device when the one or more wireless communication devices is approaching the current location of the reporting wireless communication device, wherein the network topology information comprises information about one or more neighbouring cells with respect to where the reporting wireless communication device is located and one or more supported Radio Access Technologies, RATs, at the current location of the reporting wireless communication device, wherein the one or more wireless communication devices are separate from the at least one reporting wireless communication device, wherein the selected network access is determined such that using the selected network access at the current location of the reporting wireless communication device leads to a packet data transfer with best possible Quality of Service, QoS, lowest possible cost, the packet data transfer with an upper limit as regards latency, or other appropriate criterion compared to other network accesses supported by the one or more supported RATs that are available at the current location of the reporting wireless communication device.

14. The method of claim 13, further comprising:

requesting the recommendation from the network connectivity selection node.

15. A computer program comprising computer-executable instructions for causing a wireless communication device to perform steps recited in claim 13 when the computer-executable instructions are executed on a processing unit included in the wireless communication device.

16. A reporting wireless communication device configured to facilitate selection of network access for one or more wireless communication devices, the wireless communication device comprising a processing unit and a memory, said memory containing instructions executable by said processing unit, whereby the wireless communication device is operative to:

acquire information regarding topology of networks via which one or more modems with which the reporting wireless communication device is equipped is capable of performing access, as well as a current location of the reporting wireless communication device, wherein the network topology information comprises information about one or more neighbouring cells with respect to where the reporting wireless communication device is located and one or more supported Radio Access Technologies, RATs, at the current location of the reporting wireless communication device;

establish a connection with a network connectivity selection node being capable of determining which network access is available for the one or more wireless communication devices for which selection is to be facilitated; and report the acquired network topology information of each of said any modems, as well as said current location, to the network connectivity selection node, wherein the network connectivity selection node is capable of advising the one or more wireless communication devices which network access to select when in the reported location based on the reported network topology information, such that a recommendation about which network access to use to perform at the reported location is determined based at least on the network topology information, and the recommendation is transmitted to at least the one or more wireless communication devices other than the reporting wireless communication device when the one or more wireless communication devices is approaching the current location of the reporting wireless communication device;

wherein the selected network access is determined such that using the selected network access at the current location of the reporting wireless communication device leads to a packet data transfer with best possible Quality of Service, QoS, lowest possible cost, the packet data transfer with an upper limit as regards latency, or other appropriate criterion compared to other network accesses supported by the one or more supported RATs that are available at the current location of the reporting wireless communication device.

17. The reporting wireless communication device of claim 16, wherein the reporting wireless communication device is the wireless communication device for which network access selection is to be facilitated, further being operative to:

receive, in reply to the reporting, the recommendation on which network access to perform at the reported location.

18. The reporting wireless communication device of claim 17, further being operative to:

perform the network access in accordance with the received recommendation.

19. The reporting wireless communication device of claim 16, further being operative to:

receive a trigger for acquiring the information regarding topology of networks via which one or more modems with which the reporting wireless communication device is equipped is capable of performing access, as well as a current location of the reporting wireless communication device.

20. The reporting wireless communication device of claim 16, further being operative to, when acquiring network topology information:

acquire broadcasted network topology information.

21. The reporting wireless communication device of claim 16 further being operative to, when acquiring network topology information:

acquire unicasted network topology information.

22. A network connectivity selection node configured to facilitate selection of network access for one or more wireless communication devices, the network connectivity selection node comprising a processing unit and a memory, said memory containing instructions executable by said processing unit, whereby the network connectivity selection node is operative to:

establish a connection with at least one reporting wireless communication device;

receive information regarding topology of networks via which one or more modems with which said at least one reporting wireless communication device is equipped is capable of performing access, as well as a current location of the at least one reporting wireless communication device, wherein the network topology information comprises information about one or more neighbouring cells with respect to where the reporting wireless communication device is located and one or more supported Radio Access Technologies, RATs, at the current location of the reporting wireless communication device;

store the received network topology information and said location;

establish a connection with the one or more wireless communication devices for which selection of network is to be facilitated when the one or more wireless communication devices is approaching the current location of the reporting wireless communication device;

determine, from the network topology information, a recommendation on which network access the one or more wireless communication devices for which selection of network is to be facilitated should perform at said location; and transmit, the recommendation to the one or more wireless communication devices for which selection of network is to be facilitated, wherein the one or more wireless communication devices are separate from the at least one reporting wireless communication device, wherein the selected network access is determined such that using the selected network access at the current location of the reporting wireless communication device leads to a packet data transfer with best possible Quality of Service, QoS, lowest possible cost, the packet data transfer with an upper limit as regards latency, or other appropriate criterion compared to other network accesses supported by the one or more supported RATs that are available at the current location of the reporting wireless communication device.

23. The network connectivity selection node of claim 22, wherein the reporting wireless communication device is the wireless communication device for which network access selection is to be facilitated.

24. The network connectivity selection node of claim 22, further being operative to:

transmit a trigger to the reporting wireless communication device for acquiring the information regarding topology of networks via which one or more modems with which the reporting wireless communication device is equipped is capable of performing access, as well as a current location of the reporting wireless communication device.

* * * * *